(12) United States Patent
Charas (10) Patent No.: US 6,381,462 B1
(45) Date of Patent: Apr. 30, 2002

(54) METHOD AND COMMUNICATIONS SYSTEM WITH DYNAMICALLY ADAPTABLE SUBSCRIBER UNITS

(75) Inventor: Philippe Charas, Upplands-Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/268,644

(22) Filed: Mar. 16, 1999

(51) Int. Cl.[7] ................................................ H04Q 7/20
(52) U.S. Cl. ........................................ 455/452; 455/562
(58) Field of Search ................................ 455/450, 452, 455/561, 562, 62, 509; 342/368, 371

(56) References Cited

U.S. PATENT DOCUMENTS

| 5,303,240 A | | 4/1994 | Borras | |
|---|---|---|---|---|
| 5,559,806 A | * | 9/1996 | Kurby et al. | 455/562 |
| 5,903,826 A | * | 5/1999 | Nowak | 455/277.1 |
| 5,991,630 A | * | 11/1999 | Charas | 455/452 |

FOREIGN PATENT DOCUMENTS

| EP | 0 788 284 | 8/1997 |
|---|---|---|
| EP | 0 847 209 | 6/1998 |

OTHER PUBLICATIONS

Dag Akerberg, Contribution to the ITU-R "Land Mobile Handbook"—Section 10 "Cordless Telephone and Cordless Telecommunications Systems"—Annex B.5 "DECT", Jun. 29, 1998.

* cited by examiner

Primary Examiner—Nguyen Vo
(74) Attorney, Agent, or Firm—Burns, Doane, Swecker & Mathis, L.L.P.

(57) ABSTRACT

A radio local loop system which uses an improved dynamic channel selection scheme whereby the fixed subscriber units can automatically select the available traffic channel that exhibits the best signal quality characteristics for establishing a connection. The radio system has fixed subscriber units which measure received signals from radio stations and determine a signal quality factor for each received signal. The fixed subscriber units will create and maintain a traffic channel register that stores the frequency, time slot, radio station number, and fixed subscriber unit integer scan angle for each signal. The fixed subscriber units are assigned an available radio channel and antenna scan angle based upon the signal quality.

15 Claims, 5 Drawing Sheets

| FREQUENCY CARRIER | TIME SLOT | RADIO STATION NO. | SIGNAL QUALITY |
|---|---|---|---|
| 1 | 1 | 1 | 0.1% BER |
| 1 | 2 | 1 | 0.08% BER |
| 1 | 3 | 1 | 0.07% BER |
| 1 | 4 | 1 | 0.12% BER |
| ⋮ | ⋮ | ⋮ | ⋮ |
| 10 | 12 | 2 | 0.17% BER |

FIG. 5

| FREQUENCY CARRIER | TIME SLOT | RADIO STATION NO. | SCAN ANGLE | SIGNAL QUALITY |
|---|---|---|---|---|
| 1 | 1 | 1 | 1 | 0.1% BER |
| 1 | 2 | 1 | 1 | 0.8% BER |
| 1 | 3 | 1 | 1 | 0.07% BER |
| 1 | 4 | 1 | 1 | 0.12% BER |
| ⋮ | ⋮ | ⋮ | ⋮ | ⋮ |
| 10 | 12 | 2 | k | 0.17% BER |

METHOD AND COMMUNICATIONS SYSTEM WITH DYNAMICALLY ADAPTABLE SUBSCRIBER UNITS

This application claims priority under 35 U.S.C. §120 to provisional application Ser. No. 60/109,705, filed on Nov. 24, 1998.

BACKGROUND

1. Field of the Invention

The present invention relates to radio telecommunications systems, and more particularly, to radio local loop systems.

2. Brief Description of the Related Art

A radio local loop system ("RLL") is a wireless telecommunications system, wherein fixed subscriber units or terminals communicate with the system over an air interface. Such radio systems are connected to private or public switched telephone networks and include a number of radio domains, each radio domain containing one or more radio stations (RS), or base stations. Each radio station controls the wireless communication links with any number of fixed subscriber units located in a corresponding geographical coverage area. A control unit for each radio domain stores and maintains a subscriber list containing the identification codes for each fixed subscriber unit assigned to that radio domain.

A fixed subscriber unit is typically either immobile or limited in its ability to be moved during operation (e.g., as is the case with a cordless telephone). All communication with the fixed subscriber unit is handled through a radio station servicing a corresponding coverage area in which the fixed subscriber unit is located. The fixed subscriber unit has a transceiver and an antenna for transmitting and receiving telecommunications data to and from the radio station via the air interface, over at least one pre-assigned radio channel, wherein a radio channel is defined by any number of different channel access schemes.

One such channel access scheme is known in the art as time division multiple access (TDMA). In a TDMA based system, such as a TDMA based RLL system, each of a number of frequency carriers is subdivided into a number of time slots. By subdividing each frequency carrier into multiple time slots, the traffic capacity of the system is substantially increased as each of a number of fixed subscriber units are able to communicate over a single frequency carrier by limiting the time during which each transmits or receives data and control information to one or more assigned time slots.

A TDMA based system may further be characterized as either a time division duplex (TDD) system or a frequency division duplex (FDD) system. In a TDMA/FDD system, each frequency carrier is subdivided into time slots as described above. However, certain frequency carriers are dedicated to carrying downlink traffic (i.e., data and/or control information being transmitted from a radio station to a fixed subscriber unit), while other frequency carriers are dedicated to carrying uplink traffic (i.e,. data and/or control information being transmitted from a fixed subscriber unit to a corresponding radio station). In contrast, each frequency carrier handles both uplink and downlink traffic in a TDMA/TDD based system, such that approximately half of the time slots associated with a given frequency carrier are predesignated for carrying downlink traffic, while the remaining time slots associated with that frequency carrier are predesignated for carrying uplink traffic. A RLL system that employs the well-known Digital Enhanced Cordless Telecommunications (DECT) standard is an example of a TDMA/TDD based system.

In recent years, the demand for wireless radio communication services, and in particular, fixed radio communication services, has increased at an extraordinary rate. This is problematic because radio network resources are generally limited, thereby limiting both the geographic area that a system is capable of covering and limiting the amount of traffic (i.e., the traffic load) that a system is capable of handling. Certainly, one way to address this problem would be to construct new networks and/or to expand existing networks; however, such a solution would be extremely expensive.

An alternative solution to these and other related problems has been to increase the maximum range (i.e., the maximum operating distance between a fixed subscriber unit and a radio station), thereby increasing coverage area, by increasing the gain factor G of the antenna associated with each of the fixed subscriber units, wherein range is generally determined by the following relationship:

$$\text{RANGE} = \frac{G}{(T+I)}$$

and wherein T is the noise temperature at the receiver and I represents interference. The gain factor G can be increased in a number of different ways. First, the gain factor G can be increased by simply boosting transceiver power. Unfortunately, this is generally an unacceptable option because boosting power is likely to result in a corresponding increase in the interference level in the geographic coverage area, as well as neighboring geographic coverage areas. Moreover, in accordance with the relationship above, an increase in interference levels would actually have the effect of limiting range.

The gain factor G can also be increased through the use of directional antennas. Directional antennas achieve a greater gain factor G by producing a significantly more narrow antenna beam. The use of directional antennas to generally increase the coverage area of an RLL system is a more desirable option than boosting transceiver power because it does not typically lead to increased interference levels. However, there are other problems associated with the use of directional antennas. As the transmit and receive antenna beams are generally more narrow, the task of directing (i.e., steering) the antenna beams so that they are accurately pointing in the direction of the radio station is somewhat more difficult.

Presently, the use of directional antennas requires that highly trained personnel install or perform regular adjustments on fixed subscriber units to insure that the antennas are, in fact, accurately pointing toward the corresponding radio station. And, as one skilled in the art will readily appreciate, this is extremely expensive, particularly if the RLL system is constantly undergoing network reconfiguration and/or network expansion to include the addition of new radio stations. Accordingly, in a fixed RLL system, it would be desirable to have fixed subscriber units that employ directional antennas but without the need to perform complex installation and/or readjustment procedures, or the expense associated therewith.

SUMMARY

The present invention generally relates to a method and/or communication system that involves the dynamic selection of communication channels by fixed subscriber units in a RLL system, wherein the fixed subscriber units employ directional antennas whose scan angle (i.e., the angle representing the direction in which radio frequency energy is being transmitted and received through the directional antenna) can be automatically adjusted and then selected as part of the dynamic channel selection process, and wherein the communication channel over which a fixed subscriber unit communicates is defined not only by the radio station through which it communicates, the frequency carrier over which it communicates, and the one or more time slots during which it communicates, but also by the scan angle of the directional antenna.

In accordance with one aspect of the present invention, the communication system includes a radio station and a terminal. The terminal includes an antenna through which said terminal transmits and receives signals with a radio station while varying the scan angle of the antenna. The system also has means for determining a quality factor for each signal. Then, based on the quality factor at each scan angle, the system can select a communication channel over which the terminal can communicate with said radio station.

In accordance with an additional aspect of the present invention, the communication system includes a terminal and a plurality of radio stations. The terminal has an antenna whose scan angle can be automatically varied. The terminal measures received signals from the plurality of radio stations and determines a quality factor for each communication channel defined by a frequency carrier, time slot, antenna scan angle, and/or radio station combination. Based on the signal quality factor at each antenna scan angle, the terminal selects a communication channel over which said terminal can communicate with one or more radio stations.

In accordance with a further aspect of the invention, the improved method for performing dynamic channel selection includes the steps of transmitting and receiving signals from a radio station to a terminal while varying the scan angle of an antenna associated with the terminal, determining a quality factor for each communication channel while the transmit and receive antenna scan angle is varied, and then selecting a communication channel over which said terminal can communicate with said radio station based on the signal quality factor.

The present invention provides advantages over the prior art. First, this improved dynamic channel selection scheme allows the subscriber unit to automatically select an available traffic channel that exhibits the best signal quality characteristics for establishing a connection. Second, the improved dynamic channel selection scheme can be used in a communication system using narrow beam antennas. Thus, the cost efficiency from increased radio station range will not be lost since the installation or adjustment of antennas is not limited to highly trained personnel.

BRIEF DESCRIPTION OF THE DRAWINGS

The present invention will now be described in greater detail with reference to the accompanying drawings, in which like elements bear like reference numerals, and wherein.

DETAILED DESCRIPTION OF THE PREFERRED EMBODIMENTS

Figure 1:
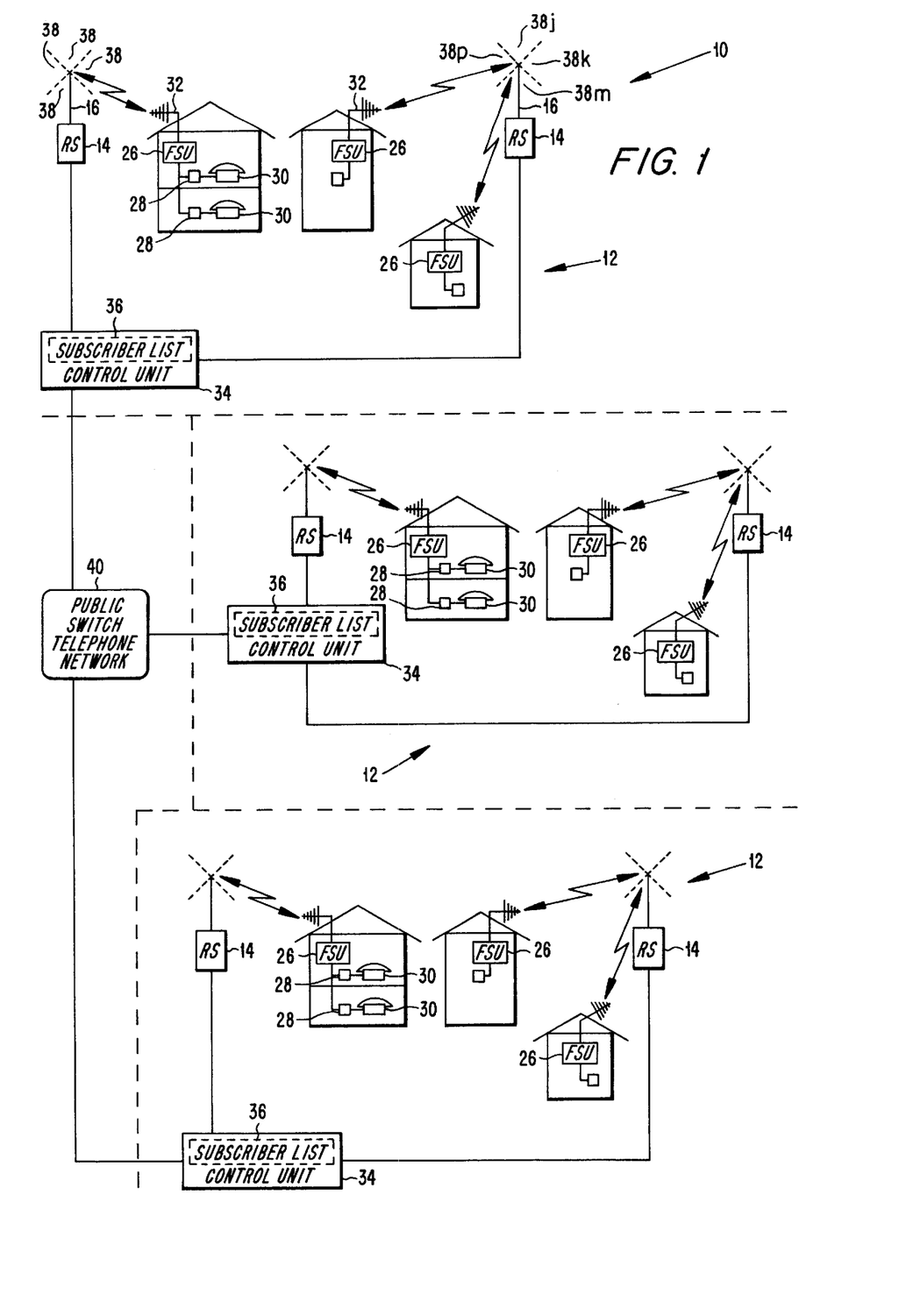
FIG. 1 illustrates a radio local loop system.

FIG. 1 illustrates the configuration of a typical radio local loop (RLL) system 10. As shown in FIG. 1, the coverage area associated with the RLL system 10 is divided into smaller, adjoining geographical areas, herein referred to as radio domains 12. FIG. 1 also illustrates that each radio domain 12 contains a control unit 34, wherein the control unit connects the corresponding radio domain with a public switch telephone network 40. In addition, the control unit 34 maintains, among other things, a subscriber list 36, which identifies all of the fixed subscriber units (FSU) assigned to the corresponding radio domain 12. Each radio domain 12 also includes one or more radio stations 14 which are linked to the control unit 34, typically over a wireline connection, and linked to a plurality of FSU 26 over a wireless or air interface. Although the RLL system 10 is illustrated as including three radio domains 12 which, in turn, contain two radio stations 14, it will be understood that the RLL system may include more than or fewer than three radio domains, while each radio domain 14 may contain more than two radio stations or as few as one radio station.

The FSUs 26, as stated above, communicate with a corresponding radio station 14 over a wireless interface. Accordingly, each FSU 26 has a transmit and receive antenna 32 which, in accordance with conventional practice, have been manually installed and/or adjusted so that they effectively point in the general direction of a corresponding radio station 14. In addition, each FSU 26 is associated with one or more communication devices, for example, cordless telephones 30, which are connected to the FSU via a socket 28. However, it will be understood by those skilled in the art that the communication devices may include devices other than cordless telephones, such as computer terminals, fax machines and the like.

Figure 2:
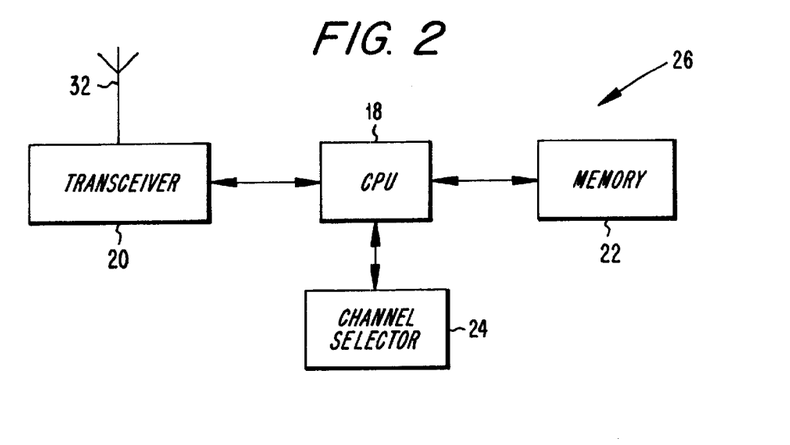
FIG. 2 is a block diagram of a fixed subscriber unit according to an exemplary embodiment of the present invention.

FIG. 2 depicts the basic components in a typical FSU 26. As shown in FIG. 2, a typical FSU includes, among other features, a transceiver 20, a CPU 18, a memory 22 and a channel selector 24, the functions of which will be described in greater detail below.

Figure 3:
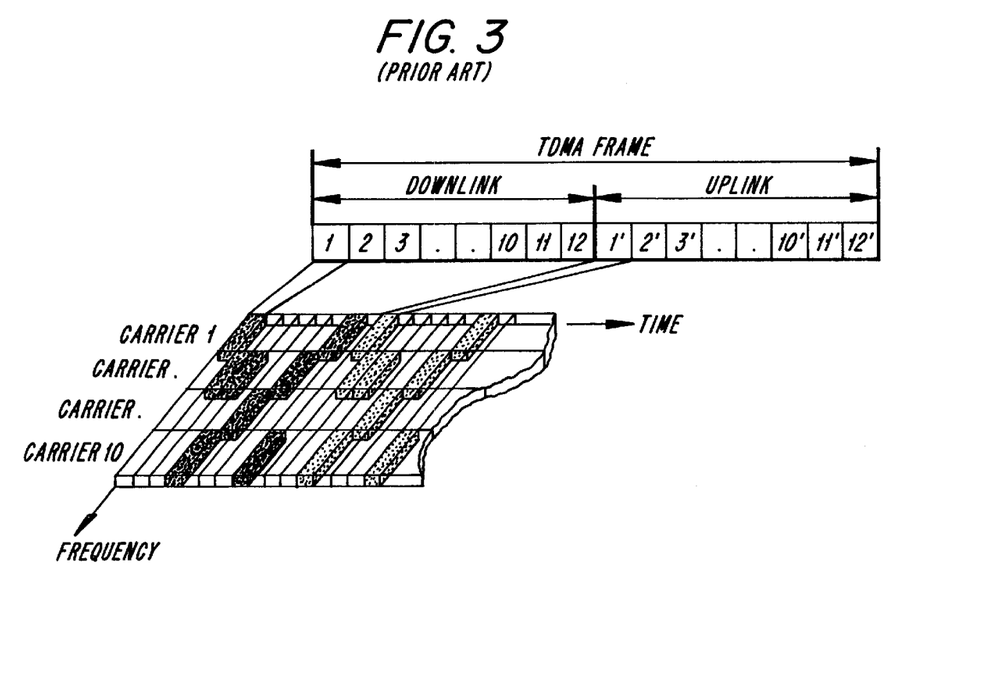
FIG. 3 illustrates a DECT frame structure.

In order for the FSU 26 and the various radio stations 14 to communicate with one another over a wireless interface, a channel access scheme is required, such as the exemplary TDMA/TDD channel access scheme illustrated in FIG. 3. As illustrated in FIG. 3, the exemplary TDMA/TDD channel access scheme has ten frequency carriers, wherein each of the ten frequency carriers is divided into time frames, and wherein each time frame is further divided into a number of time slots, for example, 24 time slots. As the channel access scheme in FIG. 3 is a TDD based scheme, one skilled in the art will appreciate that half, or approximately half, of the time slots (e.g., 12 time slots) associated with each of the ten frequency carriers are set aside for downlink (i.e., from radio station to terminal) communication, while the remaining time slots associated with each of the ten frequency carriers are set aside for uplink (i.e., from terminal to radio station) communications.

In general, the ten frequency carriers are divided amongst the radio stations 14 in each radio domain 12. For example, if the radio domain 12 has two radio stations 14, the first radio station may be assigned frequency carriers 1–5 for use in communicating with a number of corresponding FSU, while the second radio station may be assigned frequency carriers 6–10. Each of the various FSU then receives data and control information from a corresponding radio station 14 during an assigned downlink time slot and transmits data and control information to the corresponding radio station 14 during an assigned uplink time slot associated with one of the frequency carriers assigned to that radio station 14. It will be understood, however, that if the traffic load is relatively low, a FSU may be permitted to communicate with its corresponding radio station 14 over more than one frequency carrier and/or more than one uplink and downlink time slot. Accordingly, the communication channel linking a particular FSU and a particular radio station 14 is defined by: i) an identifier code that uniquely identifies the radio station 14 through which the FSU is communicating, ii) a frequency carrier assigned to that radio station 14 over which the FSU is communicating, and iii) a downlink and an uplink time slot associated with that frequency carrier during which the FSU is communicating. The exemplary TDMA/TDD channel access scheme depicted in FIG. 3 is well known in the art.

Figure 4:
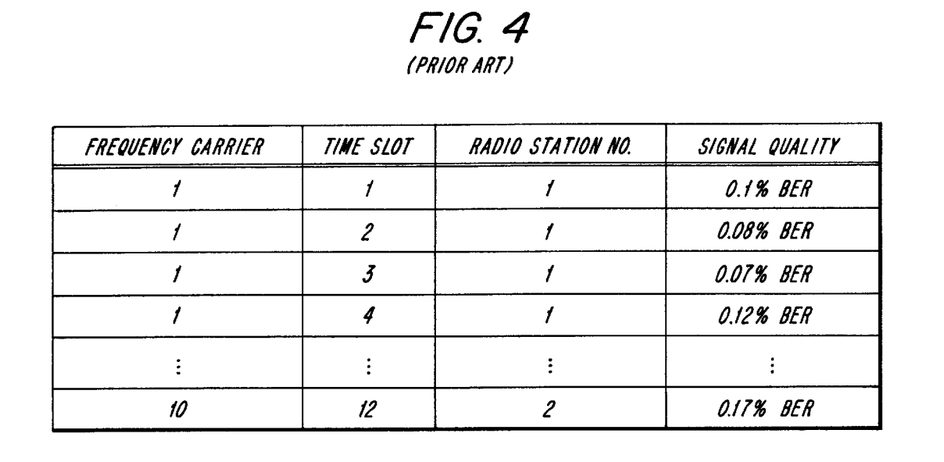
FIG. 4 illustrates stored data in a fixed subscriber unit.

When a connection is first established between a FSU 26 and the RLL, it is preferable that the channel or channels exhibiting the best possible signal quality characteristics be assigned to support the connection. Of course, the same is true for existing connections as well. To help ensure that the channel or channels exhibiting the best possible signal quality characteristics are assigned to support new or existing connections, the CPU 18 in each FSU 26 will be capable of continuously deriving a signal quality factor for each channel. The signal quality factor may, for example, be derived as a function of one or more link parameters such as carrier-to-interference ratio (C/I), bit error rate (BER), frame erasure rate (FER), radio signal strength indicator (RSSI), or a combination thereof, and the values associated with the one or more link parameters are measured by the FSU 26 during those periods of time where the FSU 26 is not transmitting or receiving data or control information. Once derived, the signal quality factors can be stored in the memory 22, for example, in tabular form as illustrated in FIG. 4. Then by continuously updating the signal quality factor values stored in the memory 22, the channel selector 24 in the FSU 26 can dynamically select the channel or channels exhibiting the best signal quality characteristics when a connection is first established or during an existing connection, if the signal quality associated with the channel or channels supporting the existing connection degrade below an acceptable level.

The present invention concerns an improvement in the way RLL systems accomplish dynamic channel selection. More particularly, the present invention extends the principle of dynamic channel selection by taking into consideration the FSU antenna scan angle during the dynamic channel selection process, where scan angle is defined as the direction in which the peak radio frequency energy is being transmitted and received relative to a reference direction. While the present invention is primarily intended to be implemented in a fixed radio system, such as a DECT based system, the present invention is not limited thereto.

Figure 5:
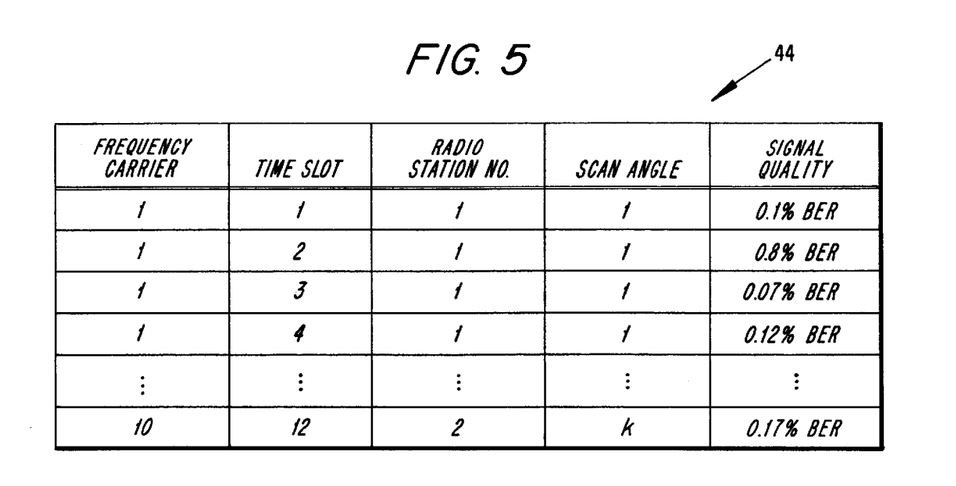
FIG. 5 illustrates stored data in a fixed subscriber unit, wherein the stored data includes antenna scan angle.

Because the present invention takes the scan angle of the antenna 32 into consideration during dynamic channel selection, the CPU 18 must continuously derive a signal quality factor for each channel, where a channel linking a particular FSU and a particular radio station 14 is now defined by: i) an identifier code that uniquely identifies the radio station 14 through which the FSU is communicating, ii) a frequency carrier assigned to that radio station 14 over which the FSU is communicating, iii) a downlink and an uplink time slot associated with that frequency carrier during which the FSU is communicating, and iv) the scan angle of the antenna 32. Again, the signal quality factor values may be stored in a memory 22, for example, in tabular form as illustrated in FIG. 5. Appropriately, the table shown in FIG. 5 contains a signal quality factor value for each frequency carrier, time slot, radio station, and antenna scan angle combination.

Figure 6:
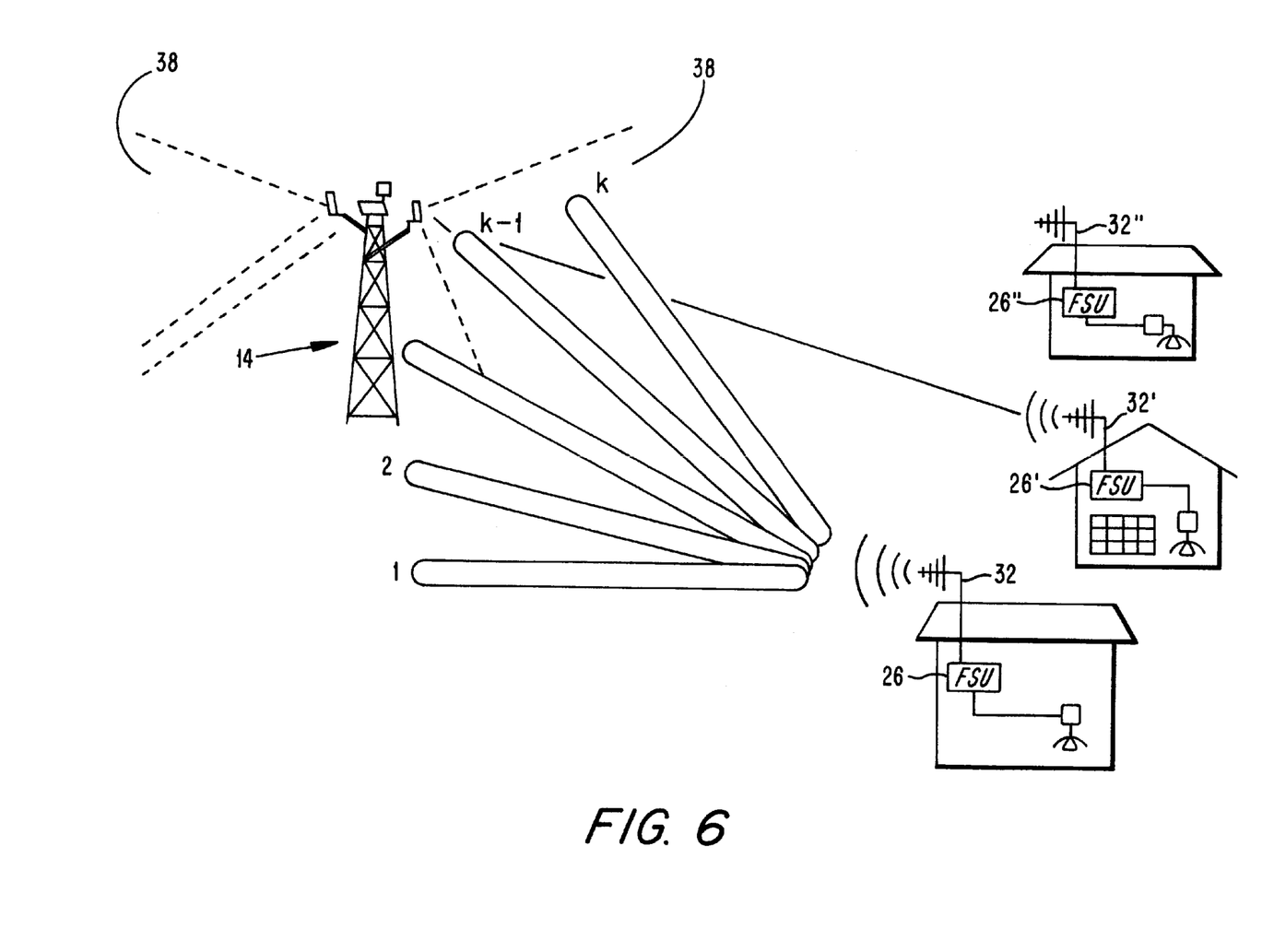
FIG. 6 illustrates "k" different scan angles for a directional antenna associated with a fixed subscriber unit.

In order to derive a signal quality factor for each channel, that is, each frequency carrier, time slot, radio station, and antenna scan angle combination, in accordance with a preferred embodiment of the present invention, the antenna 32 associated with a given FSU 26 is automatically swept through "k" different scan angles, as illustrated in FIG. 6. As the antenna is swept through each of the "k" different scan angles, the FSU 26 measures the value of one or more link parameters such as BER, FER, C/I, RSSI or the like, and therefrom, derives a signal quality factor for each channel. The signal quality factor values are then stored in the memory 22 and repeatedly updated, for example, 500 times per second, thereby creating a more accurate, dynamic picture of the radio frequency environment surrounding the FSU 26. In doing so, the FSU 26 can dynamically select and assign the one or more traffic channels that exhibit the best signal quality characteristics for a new connection or to an existing connection during call handover.

As mentioned, the antenna 32 is automatically swept through the "k" different scan angles. This may be accomplished by mechanically sweeping a rotatable antenna to each of the "k" different scan angles, by electronically sweeping a phased-array antenna to each of the "k" different scan angles, or by selecting each one of a number of fixed directional antennas, wherein the boresight associated with each directional antenna is coincident with each of the "k" different scan angles. However, regardless of whether the automatic redirection of antenna scan angle is accomplished mechanically, electronically, or through the selection of a number of directional antennas, it will be understood that the process of automatically sweeping through the "k" different scan angles, measuring the one or more link parameters, and deriving a signal quality factor for each channel can be controlled through a dynamic channel selection algorithm resident in, for example, the memory 22.

Figure 7:
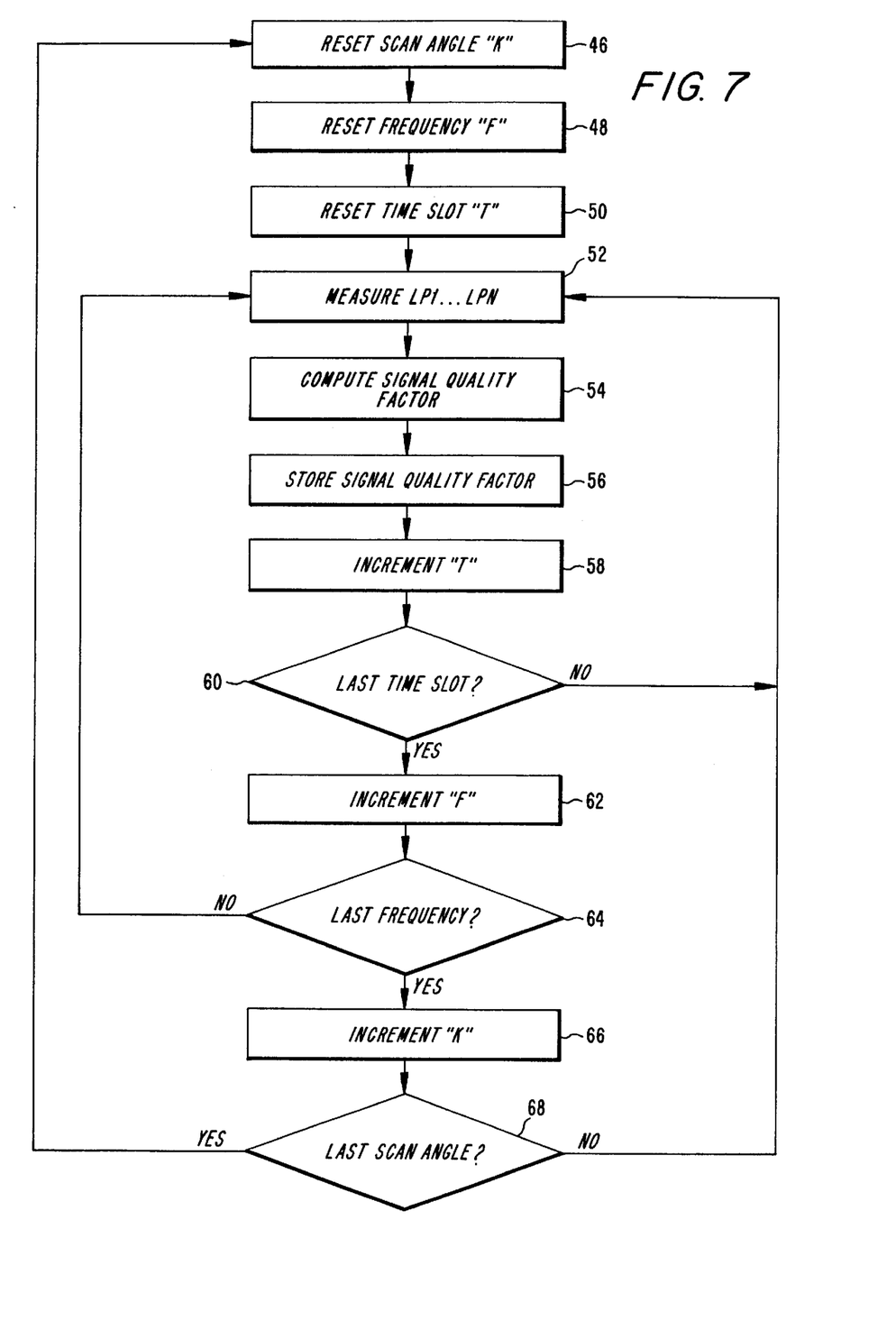
FIG. 7 is a flowchart showing the method of assigning a subscriber unit based on measured radio signals according to an exemplary embodiment of the present invention.

FIG. 7 shows the steps of an exemplary technique for obtaining a signal quality factor for each channel in support of the dynamic channel selection process of the present invention. The block 46 indicates a first general step of a FSU resetting the value of the scan angle "k" in its communication channel signal quality table 44. At blocks 48 and 50, the FSU resets the values of the frequency carrier and time slot in its signal quality table 44. Next at block 52, the FSU measures one or more link parameters (i.e., link parameters 1 through "N"), such as C/I, BER, FER, and RSSI, for a communication channel corresponding to a first time slot, frequency carrier, scan angle, and radio station combination. The FSU at block 54 then determines a quality factor for that channel, and the FSU stores the quality factor in the signal quality table 44 in memory 22 at block 56.

At block 58, the FSU incrementally increases the time slot. The flow then moves to decision block 60 where it is determined whether or not the FSU reached the last time slot. If so, the flow moves to block 62 where the FSU resets the time slot and incrementally increases the frequency carrier. Otherwise, the flow loops back to block 52 where the FSU measures the link parameter(s) associated with a second or subsequent communication channel corresponding to time slot, frequency carrier, scan angle, and radio station combination.

Having increased the frequency carrier at the FSU, the flow then proceeds to decision block 64. Here it is determined whether or not the FSU has reached the last frequency carrier. If so, the flow moves to block 66 where the FSU resets the time slot and the frequency carrier and then increases the scan angle. Otherwise, the flow loops back to block 52, and the FSU continues to measure the link parameter(s) associated with the subsequent communication channel corresponding to time slot, frequency carrier, scan angle, and radio station combination.

At decision block 68, it is determined whether or not the FSU reached the last scan angle. If so, the flow moves to the beginning at block 46, and the FSU resets the value of the scan angle in its communication channel signal quality table 44. If the answer to this determination is no, then the flow loops back to block 52 where the FSU measures the link parameter(s) of the subsequent communication channel corresponding to time slot, frequency carrier, scan angle, and radio station combination. A signal quality factor is then computed for the channel by the FSU. By continuously measuring and updating the signal quality factor for each communication channel, the FSU can, through this dynamic channel selection process, compare the signal quality factor values associated with the various communication channels and select the channel or channels that exhibits the best signal quality characteristics. Accordingly, the FSU retunes to the selected channel or channels. It might be preferable if the channel selection algorithm continuously compared the signal quality factor values and ranked them in order of signal quality.

In an alternative embodiment, the dynamic channel selection process selects the channel or channels for communication between the FSU and RLL system by determining whether the channel meets predefined quality criteria. The first channel which satisfies the quality criteria is allocated for the connection.

In a further embodiment, the order in which the FSU incrementally increases the time slot, frequency carrier, and scan angle can be varied such that the FSU incrementally increases the frequency carrier or scan angle before incrementally increasing the time slot.

The present invention concerns the improvement of a radio system using dynamic channel selection in such a way that the dynamic channel selection principle is extended to the antenna portion of the fixed terminal. This invention provides the advantages of automatic selection of terminal to radio station using a narrow beam antenna, resulting in increased range; significant reduction and probable elimination of interference from nearby terminals and terminal to radio station, thereby improving system capacity; and soft hand-over between several non-collocated radio stations, providing improved signal quality.

While the invention has been described in detail with reference to the preferred embodiments thereof, it will be apparent to one skilled in the art that various changes and modifications can be made and equivalents employed, without departing from the present invention.

What is claimed is:

1. An arrangement for a radio communication system capable of dynamic channel selection, said arrangement comprising:
    a radio station;
    a fixed terminal including a transmit and receive antenna through which said fixed terminal communicates with said radio station over one or more communication channels, the one or more communication channels being defined as a function of scan angle, carrier frequency and time slot, wherein said fixed terminal comprises:
        means for varying the transmit and receive antenna scan angle, and
        means for continuously determining a signal quality factor for each of a plurality of communication channels while the transmit and receive antenna scan angle is being varied; and
    means for dynamically selecting a communication channel over which said fixed terminal is to communicate with said radio station as a function of the signal quality factor associated with each of the plurality of communication channels.

2. The arrangement of claim 1, further comprising:
    means for comparing the signal quality factor associated with each of the plurality of communication channels.

3. The arrangement of claim 2 wherein said means for dynamically selecting a communication channel over which said fixed terminal is to communicate with said radio station comprises:
    means for dynamically selecting a communication channel based on the result of said comparison of signal quality factors associated with each of the plurality of communication channels.

4. A radio communications system with dynamic channel selection comprising:
    a plurality of radio stations;
    a fixed subscriber terminal including a transmit and receive antenna through which said subscriber terminal communicates with one or more of the plurality of radio stations over at least one communication channel, wherein said fixed subscriber terminal comprises:
        means for automatically varying a scan angle of the transmit and receive antenna, and
        means for continuously determining, while the transmit and receive antenna scan angle is being varied, a signal quality factor for each of a number of communication channels, wherein each communication channel is defined by one of said plurality of radio stations, one of a number of frequency carriers, one of a number of time slots and one of a number of scan angles; and
    means for dynamically selecting the at least one communication channel over which the fixed subscriber terminal communicates as a function of the continuously updated signal quality factor.

5. The radio communications system of claim 4, further comprising:
    means for ranking each of the number of communication channels in order of signal quality based on their corresponding signal quality factors.

6. The radio communications system of claim 4 wherein said radio communications system is a radio local loop system.

7. The radio communications system of claim 4 wherein the transmit and receive antenna is a narrow beam antenna.

8. The radio communications system of claim 4 wherein said means for automatically varying the scan angle of the transmit and receive antenna comprises:
    means for mechanically rotating the transmit and receive antenna.

9. The radio communications system of claim 4 wherein said means for automatically varying the scan angle of the transmit and receive antenna comprises:

means for electronically steering the scan angle of the transmit and receive antenna.

10. The radio communications system of claim 4 wherein the transmit and receive antenna comprises a plurality of fixed, narrow beam antennas, and wherein said means for automatically varying the scan angle of the transmit and receive antenna comprises:

means for sequentially selecting each of the plurality of fixed, narrow beam antennas.

11. The radio communications system of claim 4 wherein said means for determining a signal quality factor for each of a number of communication channels associated with each antenna scan angle comprises:

means for setting a value in the fixed subscriber terminal for the scan angle, the frequency carrier, and the time slot;

means for measuring at least one link parameter for each communication channel defined by the scan angle, the frequency carrier, and the time slot;

means for computing a signal quality factor for each communication channel defined by the scan angle, the frequency carrier, and the time slot;

means for increasing the value for the time slot in the subscriber terminal if said terminal has not reached the last time slot;

means for increasing the value for the frequency carrier in the subscriber terminal if said terminal has not reached the last frequency carrier; and means for increasing the value for the antenna scan angle in the subscriber terminal if said terminal has not reached the last scan angle.

12. A method for dynamically selecting a communication channel comprising the steps of:

transmitting and receiving a signal at an antenna of a terminal from a radio station over one or more communication channels, wherein the one or more communication channels are defined as a function of scan angle, carrier frequency and time slot;

varying the transmit and receive antenna scan angle;

continuously determining a signal quality factor for each of a number of communication channels while the transmit and receive antenna scan angle is being varied; and dynamically and continuously selecting a communication channel over which said terminal is to communicate with said radio station as a function of the signal quality factor associated with each of the number of communication channels.

13. The method of claim 12, further comprising the step of:

comparing the signal quality factor associated with each of the plurality of communication channels.

14. The method of claim 12 wherein said step of dynamically selecting a communication channel over which said terminal is to communicate with said radio station comprises:

dynamically selecting a communication channel based on the comparison of signal quality factors associated with each of the plurality of communication channels.

15. The method of claim 12 wherein said step of determining a signal quality factor for each of a number of communication channels associated with each antenna scan angle comprises:

setting a value in the subscriber terminal for the scan angle, the frequency carrier, and the time slot;

measuring at least one link parameter for each communication channel defined by the scan angle, the frequency carrier, and the time slot;

computing a signal quality factor for each communication channel defined by the scan angle, the frequency carrier, and the time slot;

increasing the value for the time slot in the subscriber terminal if said terminal has not reached the last time slot;

increasing the value for the frequency carrier in the subscriber terminal if said terminal has not reached the last frequency carrier; and increasing the value for the antenna scan angle in the subscriber terminal if said terminal has not reached the last scan angle.

* * * * *